United States Patent
Jang et al.

(10) Patent No.: US 9,088,032 B2
(45) Date of Patent: Jul. 21, 2015

(54) SECONDARY BATTERY

(75) Inventors: Youngcheol Jang, Suwon-Si (KR); Eunok Kwak, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 742 days.

(21) Appl. No.: 12/628,022

(22) Filed: Nov. 30, 2009

(65) Prior Publication Data

US 2010/0136418 A1    Jun. 3, 2010

(30) Foreign Application Priority Data

Dec. 1, 2008  (KR) .................. 10-2008-0120623

(51) Int. Cl.
- H01M 2/00 (2006.01)
- H01M 2/10 (2006.01)
- H01M 2/04 (2006.01)
- H01M 10/42 (2006.01)
- H01M 2/02 (2006.01)

(52) U.S. Cl.
CPC .......... H01M 2/1066 (2013.01); H01M 2/0404 (2013.01); H01M 10/425 (2013.01); H01M 2/0217 (2013.01)

(58) Field of Classification Search
USPC ........................................................ 429/163
See application file for complete search history.

(56) References Cited

U.S. PATENT DOCUMENTS

| 6,524,739 B1* | 2/2003 | Iwaizono et al. ............... 429/61 |
| 2008/0102357 A1* | 5/2008 | Hong et al. ................... 429/122 |
| 2008/0233472 A1* | 9/2008 | Ota et al. ...................... 429/122 |
| 2009/0186268 A1 | 7/2009 | Song |

FOREIGN PATENT DOCUMENTS

| JP | 1998-308199 | * 11/1998 | ............. H01M 2/10 |
| JP | 2006-147193 | * 6/2006 | ............. H01M 2/10 |
| JP | 2006147193 | * 6/2006 | ............. H01M 2/10 |
| KR | 10 2008 0032912 | 4/2008 | |
| KR | 10 20080103652 | 11/2008 | |
| KR | 10 2009 0078181 | 7/2009 | |

* cited by examiner

Primary Examiner — Ula C Ruddock
Assistant Examiner — Osei Amponsah
(74) Attorney, Agent, or Firm — Knobbe Martens Olson and Bear LLP

(57) ABSTRACT

Disclosed is a pack type secondary battery that can be assembled by a simple process. The secondary battery comprises: a bare cell; a protection circuit module including a circuit board and a supporting member to combine the circuit board with the bare cell; and a top case covering the circuit board of the protection circuit module, where the supporting member of the protection circuit module is provided with a first coupling part and the top case is provided with a second coupling part combined with the first coupling part and the first coupling part of the supporting member is combined with the second coupling part of the top case by an interference fit method.

20 Claims, 5 Drawing Sheets

SECONDARY BATTERY

CLAIM FOR PRIORITY

This application is based on and claims priority to Korean Patent Application No. 10-2008-0120623 filed on Dec. 1, 2008 in the Korean Intellectual Property Office (KIPO), the entire contents of which are hereby incorporated by reference.

BACKGROUND

1. Field of the Invention

The present invention relates to a secondary battery, and more particularly, to a secondary battery having a strongly combined structure.

2. Description of the Related Art

Recently, portable electronic devices have been actively produced and provided with rapid development of electronic, telecommunication and computer industries. A rechargeable secondary battery has been widely used as a power source of the portable electronic device.

A pack type secondary battery is widely used at the present time. In the pack type battery, a bare cell and a protection circuit module (PCM: Protection Circuit Module) are integrated into one unit. The pack type secondary battery includes a bare cell, a protection circuit module and a top case. The protection circuit module is combined with one surface of the bare cell and the top case is combined to cover the protection circuit module. In the conventional pack type secondary battery, the top case is combined with the bare cell or protection circuit module by a resin molding part. However, the conventional combining process has required an injection molding process or an adhesive forming process. Accordingly, the manufacturing process has been complicated.

SUMMARY

Accordingly, an object of the present invention is to provide a pack type secondary battery that can be assembled by a simple process.

Another object of the present invention is to provide a pack type secondary battery whose elements are strongly combined to each other.

Additional advantages, objects and features of the invention will be set forth in part in the description which follows and in part will become apparent to those having ordinary skill in the art upon examination of the following or may be learned from practice of the invention.

According to an aspect of the present invention, there is provided a secondary battery, which comprises: a bare cell; a protection circuit module including a circuit board and a supporting member to combine the circuit board with the bare cell; and a top case covering the circuit board of the protection circuit module, where the supporting member of the protection circuit module is provided with a first coupling part and the top case is provided with a second coupling part combined with the first coupling part.

The first coupling part of the supporting member may be combined with the second coupling part of the top case by an interference fit method.

At least two supporting members may be provided in the battery.

The top case may include a cover plate and a side wall extended from the cover plate, and the circuit board of the protection circuit module may include a first surface facing the bare cell and a second surface facing the cover plate of the top case.

The supporting member may include a supporting part that is extended between the circuit board of the protection circuit module and bare cell and provided with the first coupling part.

The second coupling part may be formed at the side wall of the top case.

The circuit board may be a plate type extended in one direction.

The supporting part of the supporting member may be arranged to correspond to an end of the circuit board.

The second coupling part may be a projected part and the first coupling part may be a receiving space where the projected part is inserted.

The projected part may be hemispherical.

The first coupling part may be a through-hole to provide the receiving space.

The projected part, that is, the second coupling part may include a slant surface that is more outwardly inclined toward the bare cell.

The projected part may be hooked on the first coupling part by a hook piece provided at a side opposite to the slant surface.

The first coupling part may be a projected part and the second coupling part may be a receiving space where the projected part is inserted.

At least one supporting member may be an electrode lead plate to couple the circuit board and bare cell to each other electrically.

BRIEF DESCRIPTION OF THE DRAWINGS

The above and other objects, features and advantages of the present invention will be more apparent from the following detailed description taken in conjunction with the accompanying drawing, in which.

DETAILED DESCRIPTION OF EXEMPLARY EMBODIMENTS

Figure 1:
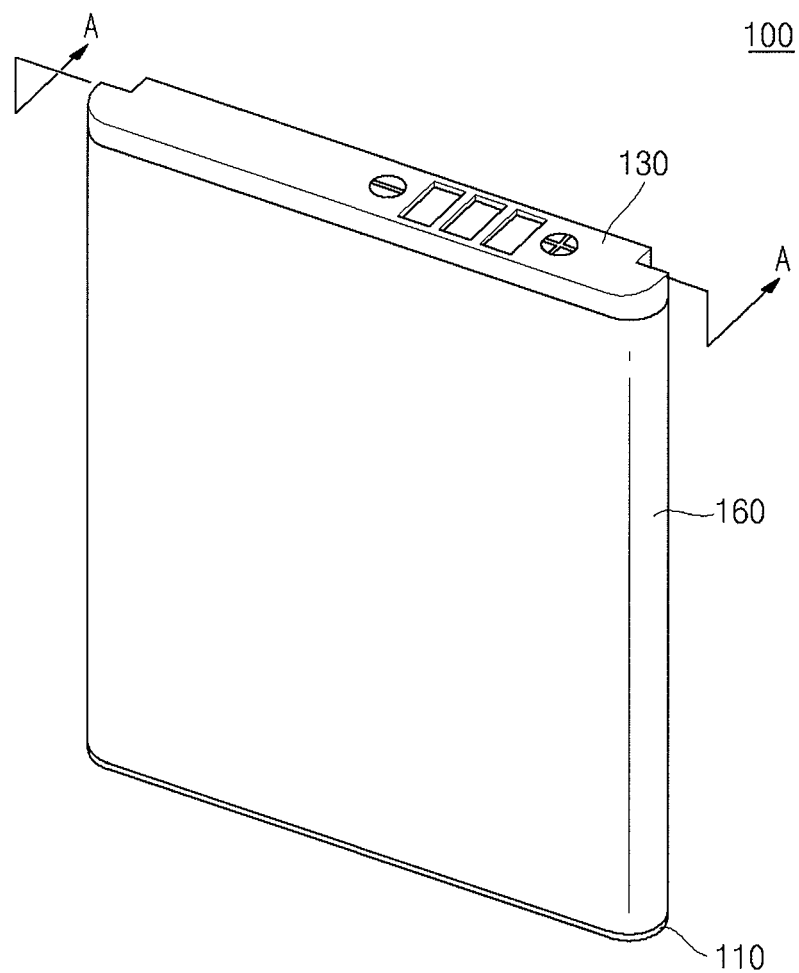
FIG. 1 is a perspective view illustrating a secondary battery according to one exemplary embodiment of the present invention.
Figure 2:
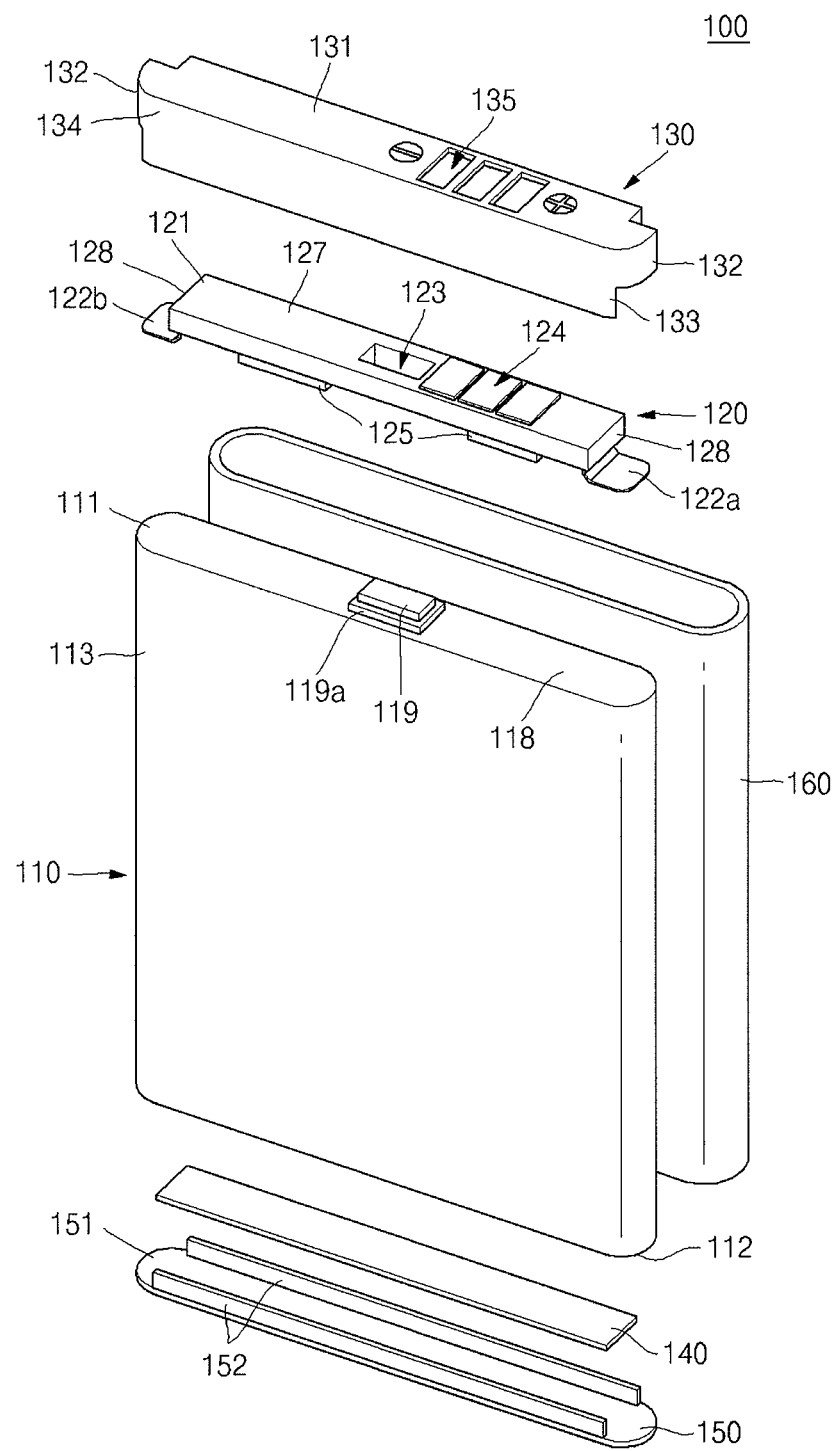
FIG. 2 is an exploded perspective view illustrating the secondary battery of FIG. 1.
Figure 3:
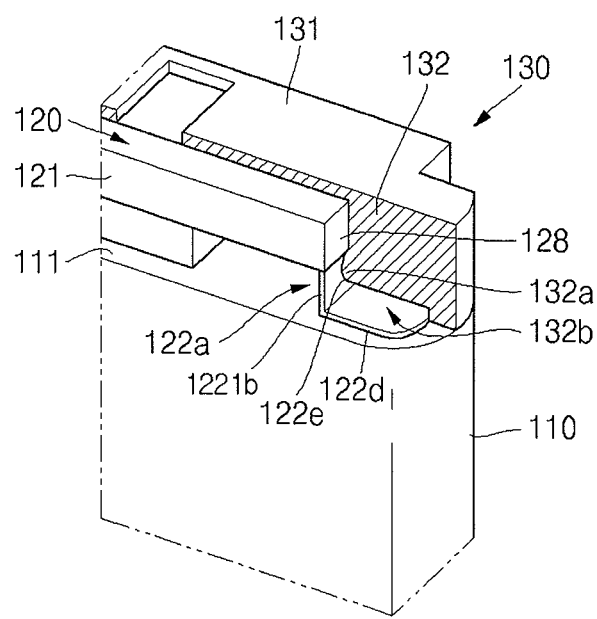
FIG. 3 is a perspective view illustrating the inside of a top case of the secondary battery of FIG. 1, which is taken by partially cutting the top case.
Figure 4:
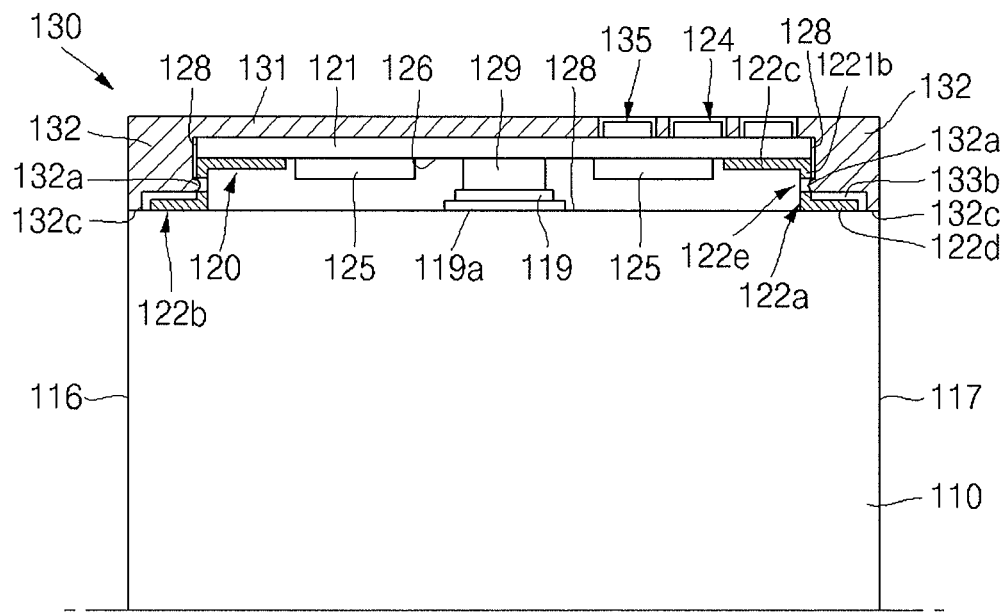
FIG. 4 is a sectional view illustrating the top case of the secondary battery of FIG. 1, that is taken along an 'A-A' line.
Figure 5:
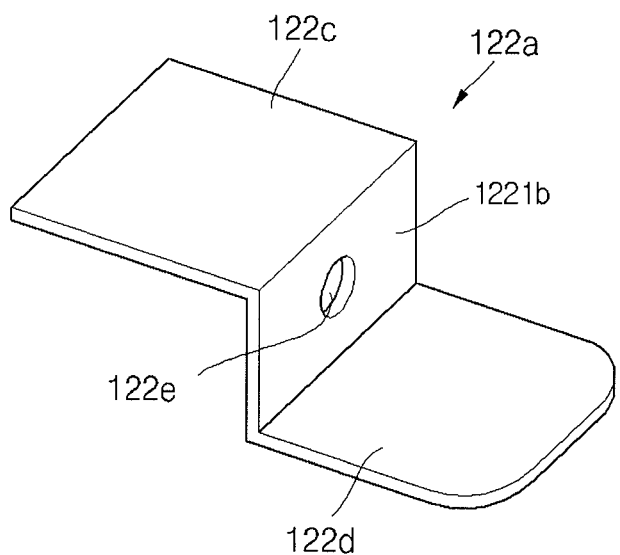
FIG. 5 is a perspective view illustrating a first supporting member shown in FIG. 3.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and members, are nothing but specific details provided to assist those of ordinary skill in the art in a comprehensive understanding of the invention, and the present invention is only defined within the scope of the appended claims. In the entire description of the present invention, the same drawing reference numerals are used for the same members across various figures.

Referring to FIGS. 1 to 5, a secondary battery 100 includes a bare cell 110, a PCM (Protection Circuit Module) 120, a top case 130, an adhesive member 140, a bottom case 150 and a label 160 is shown.

The bare cell 110 provides electrical energy and includes an electrode assembly, a can receiving the electrode assembly and a cap assembly covering the can. The electrode assembly includes a cathode plate, an anode plate and a separator wound together in a known manner. An electrode tab is combined with each of the cathode and anode plates. The bare cell 110 is a roughly in the shape of a thin plate having an upper surface 111, a lower surface 112 and a side surface 113. The upper and lower surfaces 111 and 112 are extended in one direction and face each other. A first electrode terminal 119 is projected from the upper surface 111. In the embodiment, the first electrode terminal 119 is the anode. The entire outer surface of the upper surface 111, except for the first electrode terminal 119, is the cathode terminal, that is, a second electrode terminal 118. The first and second electrode terminals 119 and 118 are insulated from each other by an insulation gasket 119a surrounding the first electrode terminal 119.

A supporting plate 151 is attached to the lower surface 112 by the adhesive member 140 such as a double-coated tape. The side surface 113 connects the upper and lower surfaces 111 and 112 to each other and includes first and second wide surfaces 114 and 115 and first and second narrow surfaces 116 and 117. The first and second wide surfaces 114 and 115 are extended in a width direction of the bare cell 110 with facing each other. The first and second narrow surfaces 116 and 117 connect the first and second wide surfaces 114 and 115 to each other.

The PCM 120 includes a circuit board 121, a first electrode lead plate 129, first and second supporting members 122a and 122b. The PCM 120 controls general operations including charge/discharge of the secondary battery 100. The circuit board 121 is a roughly rectangular plate extended in a length direction of the upper surface 111, which is printed with a wiring pattern. The circuit board 121 has a width corresponding to the upper surface 111. The circuit board 121 includes first and second surfaces 126 and 127 that are located at opposite sides to each other. An electrical circuit device 125 is provided on the first surface 126 of the circuit board 121. The electrical circuit device 125 includes elements such as a control IC, a charging/discharging switch and a thermal fuse, etc. Both ends of the first surface 126 are combined with the first and second supporting members 122a and 122b. The first surface 126 faces the upper surface 111 of the bare cell 110 with a gap between them.

The second surface 127 of the circuit board 121 is provided with an external terminal 124 that is electrically coupled to an external load or charger. The second surface 127 of the circuit board 121 faces a cover plate 131 of the top case 130. A through-hole 123 is provided in the middle of the circuit board 121. The first electrode lead plate 129 is welded to the first electrode terminal 119 of the bare cell 110 via the through-hole 123.

The first electrode lead plate 129 is electrically coupled to the first surface 126 of the circuit board 121. The first electrode lead plate 129 is electrically coupled to the first electrode terminal 119 of the bare cell 110 by a method such as welding. The welding is conducted via the through-hole 123. The first electrode lead plate 129 electrically couples the circuit board 121 to the first electrode terminal 119, that is, the anode of the bare cell 110.

The first and second supporting members 122a and 122b are respectively provided at the both ends of the circuit board 121. The first supporting member 122a is a plate type member and includes a supporting part 1221b, first and second connection parts 122c and 122d. The supporting part 1221b is provided with a first coupling part 122e. The first coupling part 122e is a through-hole type. A second coupling part 132a formed on a side wall 134 of the top case 130 is inserted into the first coupling part 122e by an interference fit method. The first connection part 122c is continued to an upper end of the supporting part 1221b and the second connection part 122d is continued to a lower end of the supporting part 1221b. The first and second connection parts 122c and 122d are roughly perpendicular to the supporting part 1221b. The first and second connection parts 122c and 122d are extended from the supporting part 1221b in opposite directions to each other. The first connection part 122c is combined with the first surface 126 of the circuit board 121. The supporting part 1221b is arranged to be continued to an end 128 of the circuit board 121. The second connection part 122d is spaced from the circuit board 121. The second connection part 122d is connected to the upper surface 111 of the bare cell 110 by a method such as welding, etc. The second connection part 122d is received in a receiving groove 133b of the top case 130, which will be explained later. The second supporting member 122b has the same construction as the first supporting member 122a and thus detailed explanation will be omitted.

The circuit board 121 is combined with the upper surface 111 of the bare cell 110 by the first and second supporting members 122a and 122b. Accordingly, the PCM 120 is combined with the bare cell 110. At least one of the first and second supporting members 122a and 122b is made of conductive material and functions as the second electrode lead plate that electrically couples the circuit board 121 to the second electrode terminal 118, that is, the cathode of the bare cell 110. In the embodiment, the supporting member functioning as the second electrode lead plate is made of nickel, but not limited thereto.

The top case 130 includes the cover plate 131, the side wall 134 extended downward from the cover plate 131. The PCM 120 is received in an inner space of the top case 130. A shape of the cover plate 131 is roughly matched with the upper surface 111 of the bare cell 110. A through-hole 135 is formed in the cover plate 131. The external terminal 124 of the PCM 120 is exposed to the outside through the through-hole 135. The inner surface of the cover plate 131 is contacted with the second surface 127 of the circuit board 121 of the PCM 120.

The side wall 134 includes both ends 132 and a connection part 133 connecting the both ends 132 to each other. The both ends 132 are respectively provided with a contact end 132c. Two contact ends 132c are contacted with both ends of the upper surface 111 of the bare cell 110 and support the top case 130. An end of the connection part 133 is extended lower than the both ends 132, thereby covering the upper part of the side surface 113 of the bare cell 110. A label 160 is attached on a portion of the connection part 133 that covers upper parts of the first and second wide surfaces 114 and 115 of the bare cell 110.

The second coupling part 132a is provided inside the top case 130, where the second coupling part 132a is combined with the first coupling part 122e formed at the first and second supporting members 122a and 122b by the interference fit method. The second coupling part 132a is a projection projected from an inner side wall of the both ends 132 of the side wall 134. The second coupling part 132a has a roughly hemispherical shape and thus easily inserted into the first coupling part 122e of the first and second supporting members 122a and 122b. The top case 130 is made of elastically deformable material and thus elastically deformed when they are combined by the interference fit method. In the embodiment, the top case 130 is made of plastic. The top case 130 is more easily and strongly combined because the first and second supporting members 122a and 122b are combined with the top case 130 by the interference fit method.

A receiving groove 133b is provided inside the top case 130, where the receiving groove 133b receives the second connection parts 122d of the first and second supporting members 122a and 122b. The receiving groove 133b is formed by inwardly cutting the inner wall of both ends of the side wall of the top case 130.

The bottom case 150 includes the supporting plate 151 and two extended parts 152 extended upward from the supporting plate 151. The supporting plate 151 has the roughly same as the lower surface 112 of the bare cell 110. The supporting plate 151 is attached to the lower surface 112 by the adhesive member 140. The two extended parts 152 cover lower parts of the first and second wide surfaces 114 and 115 of the bare cell 110. The label 160 is attached to the two extended parts 152.

The label 160 is attached to surround the top case 130 of the bare cell 110. The label 160 covers a portion of the connection part 133 of the top case 130 and the extended part 152 of the bottom case 150.

An assembling process of the above embodiment will be explained with reference to FIGS. 1 to 5 below.

First, the PCM 120 is combined with the bare cell 110. The process is performed by laser-welding the second connection parts 122d of the first and second supporting members 122a and 122b of the PCM 120 to the upper surface 111 of the bare cell 110. In this time, the first electrode lead plate 129 of the PCM 120 is laser-welded to the upper surface 111 of the bare cell 110 via the through-hole 123.

Second, the bottom case 150 is attached to the lower surface 112 of the bare cell 110 by using the adhesive member 140.

Third, the top case 130 is combined with the PCM 120 by the interference fit method. The process is performed by pushing the PCM 120 into the top case 130 or pushing the top case 130 toward the PCM 120. In this time, the top case 130 is elastically deformed and accordingly the second coupling part 132a of the top case 130 is inserted into the first coupling part 122e formed at the first and second supporting members 122a and 122b by the interference fit method. Thus, the top case 130 is more easily and strongly combined with the PCM 120.

Fourth, the label 160 is attached. The label 160 is attached to surround the connection part 133 of the bare cell 110. In this time, the label 160 covers the portion of the connection part 133 of the side wall 134 of the top case 130 and the extended part 152 of the bottom case 150. Thus, the combined state of the secondary battery 100 becomes stronger.

Figure 6:
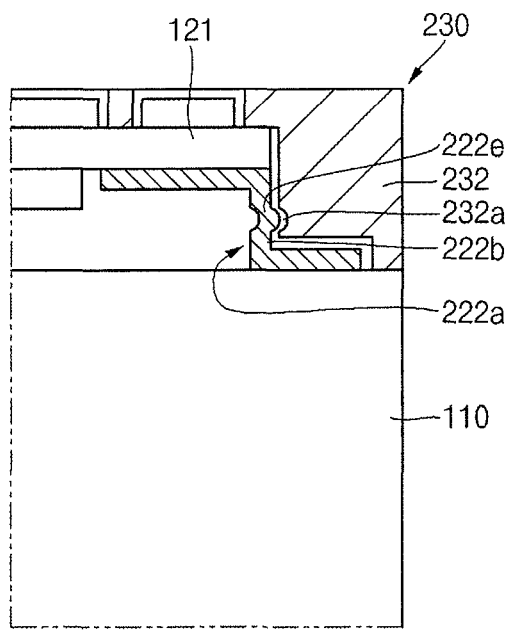
FIG. 6 is a sectional view illustrating the inside of a top case of a secondary battery according to another embodiment of the present invention, which is taken by cutting the top case.

FIG. 6 shows a secondary battery according to another embodiment of the present invention. Referring to FIG. 6, a first coupling part 222e formed at a supporting part 2221b of a first supporting member 222a is a projection type and a second coupling part 232a formed at a top case 230 is a groove to receive the first coupling part 222e. Other construction and operation are the same as the embodiment shown in FIGS. 1 to 5 and thus detailed explanation will be omitted.

Figure 7:
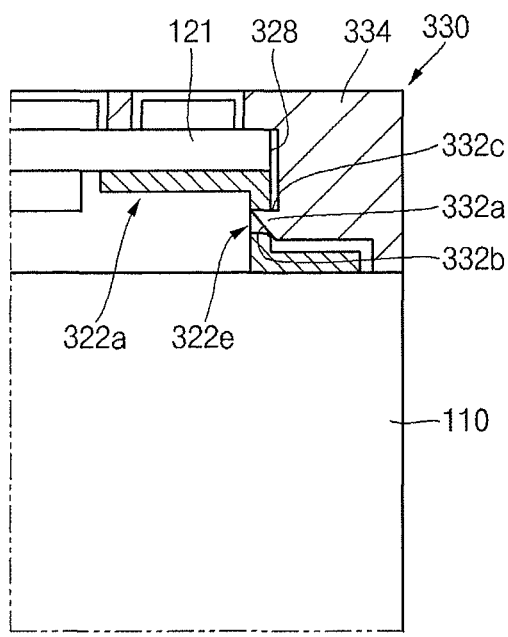
FIG. 7 is a sectional view illustrating the inside of a top case of a secondary battery according to a still another embodiment of the present invention, which is taken by cutting the top case.

FIG. 7 shows a secondary battery according to a still another embodiment of the present invention. Referring to FIG. 7, a second coupling part 332a formed at a top case 330 includes a slant surface 332b and a hook surface 332c that are arranged in the order from a lower end thereof. The coupling part 332a is more projected toward the upper part of the slant surface 332b. In other words, the slant surface 332b is more outwardly inclined toward the bare cell 110. The slant surface 332b is contacted with an end 328 of a circuit board 121 while it is combined. Accordingly, the top case 330 is more easily and elastically deformed, the hook surface 332c is arranged on a side opposite to the slant surface 332b and roughly perpendicular to a side wall 334. The combined state of the battery becomes stronger because the hook surface 332c is hooked on a first coupling part 322e of a supporting member 322a. Other construction and operation are the same as the embodiment shown in FIGS. 1 to 5 and thus detailed explanation will be omitted.

As described above, the secondary battery according to the present invention produces the following effects.

First, the top case and supporting member of the protection circuit module can be easily combined with each other by the interference fit method. Thus, the process is simplified and productivity of the battery is improved.

Second, the top case is strongly combined because it is combined with the supporting member of the protection circuit module It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
   a bare cell having an upper surface that is substantially planar wherein the upper surface has first and second ends in a lengthwise direction and first and second sides in a widthwise direction, wherein the lengthwise direction is greater than the widthwise direction;
   a protection circuit module including a circuit board that is substantially planar and extends in a plane that is substantially parallel to the plane of the upper surface of the bare cell and has a first length and width and a supporting member to combine the circuit board with the bare cell wherein the supporting member has a portion that extends in a first direction from the protection circuit module to the bare cell that is perpendicular to the plane of the upper surface of the bare cell and wherein the supporting part has a width that is smaller than the first width of the protection circuit module; and
   a top case covering the circuit board of the protection circuit module wherein the top case includes a side wall that extends in the first direction when the top case is covering the protection circuit module and a top surface that extends in a second direction that intersects the first direction,
   where the portion of the supporting member of the protection circuit module that extends in the first direction is provided with a first coupling part and the top case is provided with a second coupling part that is formed on the side wall that is integrally part of the top case combined with the first coupling part and wherein the first or second coupling part extend in a the second direction that intersects the first direction wherein the second direction is substantially parallel to the lengthwise direction of the upper surface of the bare cell, wherein the second coupling part comprise a protrusion that extends into an opening of the first coupling part.

2. The secondary battery of claim 1, wherein the first coupling part of the supporting member is combined with the second coupling part of the top case by an interference fit method.

3. The secondary battery of claim 1, wherein at least two supporting members are provided in the battery.

4. The secondary battery of claim 1, wherein the top case comprises a cover plate and a side wall extended from the cover plate,
   the circuit board of the protection circuit module comprises a first surface facing the bare cell and a second surface facing the cover plate of the top case,
   the supporting member comprises a supporting part that is extended between the circuit board of the protection circuit module and bare cell and provided with the first coupling part, and
   the second coupling part is formed at the side wall of the top case.

5. The secondary battery of claim 4, wherein the circuit board is a plate type extended in one direction, and the supporting part of the supporting member is arranged to correspond to an end of the circuit board.

6. The secondary battery of claim 1, wherein the second coupling part is a projected part and the first coupling part is a receiving space where the projected part is inserted.

7. The secondary battery of claim 6, wherein the first coupling part is a through-hole to provide the receiving space.

8. The secondary battery of claim 6, wherein the projected part is hemispherical.

9. The secondary battery of claim 6, wherein the second coupling part, that is, the projected part comprises a slant surface that is more outwardly inclined toward the bare cell.

10. The secondary battery of claim 9, wherein the projected part is hooked on the first coupling part by a hook piece provided at a side opposite to the slant surface.

11. The secondary battery of claim 1, wherein the first coupling part is a projected part and the second coupling part is a receiving space where the projected part is inserted.

12. The secondary battery of claim 1, wherein at least one supporting member is an electrode lead plate to couple the circuit board and bare cell to each other electrically.

13. A secondary battery comprising:
   a bare cell having a first surface that is substantially planar wherein the first surface has a first and second ends in lengthwise direction and a first and second sides in a widthwise direction, wherein the lengthwise direction is greater than the widthwise direction;
   a protection circuit module that is substantially planar and extends in a plane that is substantially parallel to the plane of the upper surface of the bare cell and has a first length and width
   at least one supporting member that interconnects the protection circuit module to the bare cell so as to mount the protection circuit module adjacent the first surface of the bare cell wherein the at least one supporting member has a portion that extends in a first direction from the protection circuit module to the bare cell that is perpendicular to the plane of the first surface of the bare cell and wherein the supporting part has a width that is smaller than the width of the protection circuit module;
   a top case wherein the top case includes a side wall that extends in the first direction when the top case is covering the protection circuit module and a top surface that extends in a second direction that intersects the first direction wherein the top case further having a first portion that is integrally part of the top case and extends in the second direction outward from the side wall of the top case that is substantially parallel to the lengthwise direction of the first surface of the bare cell, the top case being positioned in a mounting orientation over the first surface of the bare cell and the protection circuit module so that the protection circuit module is interposed between the top case and the first surface, wherein the first portion of the top case and the portion of the at least one supporting member comprise a projection and an opening respectively that extend in the second direction mechanically engage with each other so as to retain the top case in the mounting orientation and wherein the portion of the side wall of the top case or the portion of the at least one supporting member that extends in the first direction extend in a second direction that intersects the first direction.

14. The secondary battery of claim 13, wherein the at least one supporting member comprises a first and a second supporting members and wherein the protection circuit module has a first and second lateral edges and wherein the first and second supporting members are mounted to the first and second lateral edges of the protection circuit module.

15. The secondary battery of claim 13, wherein the at least one supporting member has a first region that interconnects with the protection circuit module, a second region that interconnects with the bare cell and a third region interposed between the first and second regions.

16. The secondary battery of claim 15, wherein the third region defines a first coupling part and wherein a second coupling part is formed on the top case in a location wherein the second coupling part can mechanically engage with the first coupling part when the top case is positioned in the mounting orientation.

17. The secondary battery of claim 16, wherein the first coupling part comprises an opening sized so as to receive the second coupling part and wherein the second coupling part is formed of an elastic material so as to interference fit within the first coupling part.

18. The secondary battery of claim 17, wherein the second coupling part comprises a projected part that is hemispherical.

19. The secondary battery of claim 17, wherein the second coupling part comprises a projected part that includes a slant surface that is more outwardly inclined towards the bare cell.

20. The secondary battery of claim 19, wherein the projected part is hooked on the first coupling part by a hook piece provided at a side opposite the slant surface.

* * * * *